UNITED STATES PATENT OFFICE.

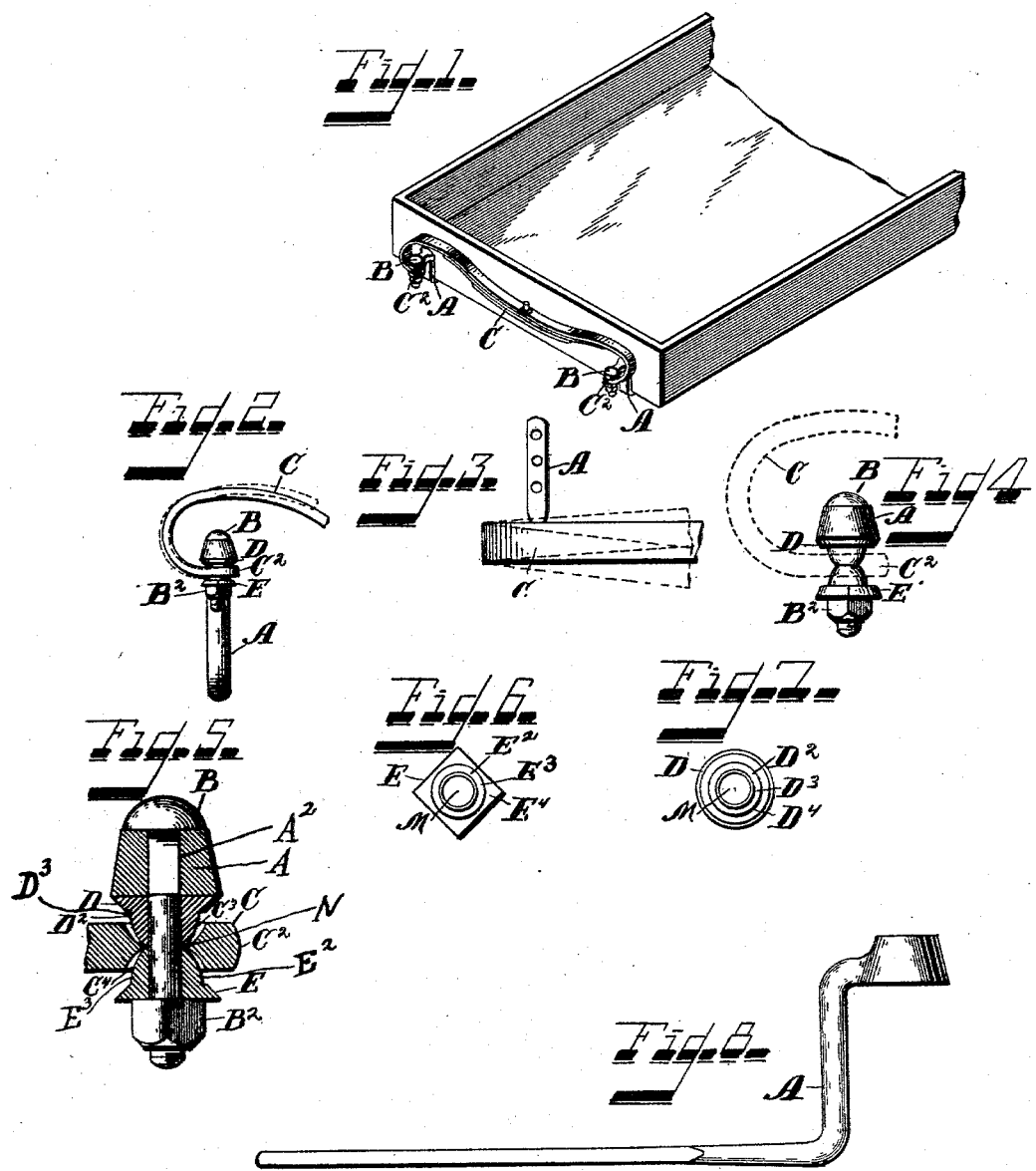

HERMAN H. UCKOTTER, OF CINCINNATI, OHIO, ASSIGNOR TO THE ANCHOR BUGGY CO., OF SAME PLACE.

VEHICLE-SPRING COUPLING.

SPECIFICATION forming part of Letters Patent No. 589,876, dated September 14, 1897.

Application filed January 9, 1897. Serial No. 618,527. (No model.)

*To all whom it may concern:*

Be it known that I, HERMAN H. UCKOTTER, a citizen of the United States, and a resident of the city of Cincinnati, in the county of Hamilton and State of Ohio, have invented certain new and useful Improvements in Vehicle-Spring Couplings, of which the following is a specification.

My invention has for its object to provide a very easy bearing between and in connection with the body-loop or like support and the spring which supports this loop and to render this bearing capable of rocking movement in any direction transverse to the planes of the adjacent portions of the body-loop and of the spring.

The several features of my invention and the various advantages resulting from their use, conjointly or otherwise, will be apparent from the following description and claims.

In the accompanying drawings, making a part of this specification, and in which similar letters of reference indicate corresponding parts, Figure 1 represents in perspective the rear portion of a vehicle-body and a spring supporting body-loops and my improved bearings combined at each terminal of the spring with the spring and the body-loops. Fig. 2 is a rear view, enlarged over Fig. 1, of a body-loop and one end portion of the spring and my improved bearing combined therewith. Fig. 3 is a top view, on the same scale as Fig. 2, of the same end of the spring and body-loop detached from the vehicle-body and illustrating in dotted lines how the bearing allows the spring lateral movement with reference to the body-loop and obviates strain upon both the spring and loop. Fig. 4 is a side elevation, enlarged over Figs. 2 and 3, of my improved bearings as they appear in practical operation—viz., when secured together and when forming one bearing—the end of the spring being shown in dotted lines to indicate where in practice it would be located, the upper end of the body-loop being shown in place. Fig. 5 is a vertical central section, on a larger scale than that of Fig. 4, of the bearing and adjacent end of the body-loop and the adjacent end of the spring, the bolt and its nut being shown in elevation. Fig. 6 is a bottom view of the lower half-bearing. Fig. 7 is a bottom view of the upper half-bearing. Fig. 8 represents a side elevation of a body-loop. Figs. 5, 6, 7, and 8 are on substantially the same scale.

A indicates the vehicle-body loop or similar supporting member. This loop has a vertical opening $A^3$ through the end of it. This opening is of a proper size to easily receive a bolt B, filling said opening and accurately fitting therein. The spring C to be supported is of any suitable size and shape and it may have one or more leaves, according to the needs of the vehicle, weight of load to be carried, elasticity required, &c. The end of the spring may come in a curved plane or in substantially a straight plane to the bearing or it may be bent around and back (recurving) substantially as shown in Figs. 1, 2, and 4.

The spring C may be a side spring or an end spring. That portion $C^2$ of the spring which meets and engages the bearing will ordinarily be substantially flat and straight. The part $C^2$ receives two bearings, one, D, entering it from above and the other, E, entering it from below. The lower part $D^2$ or bearing proper of the bearing D is in the general shape of a truncated cone, the sides $D^3$ being curved from top to bottom, substantially as shown. The entire bearing $D^2$ is circular when viewed from below. A broad flange $D^4$ is at the upper part of the bearing $D^2$ and extends out beyond the upper peripheral edge of the bearing $D^2$. This flange $D^4$, when viewed from above, is preferably circular, but may be of a sided figure, as a pentagon, hexagon, &c. The recess or opening $C^3$ in the upper side of the part $C^2$ of the spring is hollowed out to uniformly fit and inclose the greater portion of the bearing $D^2$. The latter, however, sits high in the said opening or seat $C^3$ and extends above the top surface of part $C^2$. Thus the spring may roll—*i. e.*, move in any up-and-down direction and throw the part $C^2$ at any given angle to the plane of the top $D^4$ of the bearing without striking the flanged top $D^4$ and without being impeded thereby. (See Fig. 2.)

Below the bearing D is a bearing E, made substantially like the bearing D, and having the parts $E^2$, $E^3$, and $E^4$, respectively, similar to the parts $D^2$, $D^3$, and $D^4$ of bearing D.

The position of the bearing E is the reverse of that of bearing D, the portion E² being uppermost and the flanged portion E⁴ is undermost. The under side of the portion C² of the spring has a recess C⁴ hollowed out to nicely and closely receive the upper portion of the bearing E², but the flange E⁴ is at a distance from the under surface of portion C² to give the latter opportunity to work and oscillate freely about and upon the bearing E² in the manner mentioned in regard to the operation of the bearing D². The two recesses or bearing-seats are axially coincident, and each bearing has a central (axial) opening M through it. This opening is of a size to accurately fit (without binding) the shank of the bolt B, and this shank is circular (in cross-section) at the locations where it passes through and engages these bearings D and E. There is an opening N through the spring part C², and this opening connects the opening C³ to the opening C⁴ and is axially coincident therewith. This opening N is of larger diameter than the bolt B and allows the latter play in rocking movements, in which movements the latter participates with the portion C² of the spring when the vehicle is being moved. (See dotted lines of Figs. 2 and 3.)

The lower end of the bolt B is screw-threaded, and thereon is screwed a nut B², below the lower bearing E.

The opening A² of the loop A may be square, and that part of the shank of the bolt which fits and is located in the opening A² is likewise square, so as to prevent the bolt from turning in this opening.

In practice the nut B² is tightened, and this tightening is preferably continued until the adjacent ends of these bearings D and E are approximated or impinge against each other. The respective parts of the device are now in readiness for operation.

As a matter of taste the shape of the flanged top D⁴ is circular to accord in shape with the superincumbent eye of the support A, and, on the other hand, the flanged top E⁴ is square to be symmetrical with the square nut immediately below it.

A marked advantage of my invention consists in the fact that the vehicle-body can roll in any direction without twisting the spring.

The bolt B, with the body-loop and bearings D and E, is free to roll in any direction and allow the spring to remain in its normal position. So, also, the spring can move without communicating any twisting motion to the body-loop. The interchangeable and constantly varying movements of the spring and the vehicle-body can take place without twisting the spring or in any wise straining the body-loop. Thus all strain is removed from the body at and in the vicinity where the body-loop is affixed thereto.

Where the body-loop is fixed to the corner portion of the vehicle-body, my invention relieves the corner portion from strain.

The end and side vibrations of the vehicle-body which are present when the body-loop is bolted directly to the spring are obviated.

What I claim as new and of my invention, and desire to secure by Letters Patent, is—

1. The combination of a support A, and bolt and spring, and two circular bearings curving in axial section, and facing each other, and touching each other, the spring receiving these bearings in openings from opposite sides of it, the bolt passing through the support and spring and bearings, substantially as and for the purposes specified.

2. The combination of a support, and a bolt and spring, and two bearings, annular, and inclining on their sides and facing each other, and in contact, and provided with flanges, at points separated from where they bear upon the spring, the spring being recessed on each side so as to receive the bearings, and a bolt passing through the support and bearings, and springs, and secured by a nut, the flange of one bearing impinging against the support, and the flange of the other bearing impinging against the nut, substantially as and for the purposes specified.

3. The combination of two annular bearings, each in cross-section being in external shape segments of a sphere, and a support, and a spring, and bolt, the segments meeting at their adjacent ends and the spring embracing them there and in that vicinity, and provided above and below with recesses, whose edges form bearing-surfaces for contact with the segmental bearings, substantially as and for the purposes specified.

4. The combination of two annular bearings, and having beveled edges and in operation, inverted as regards each other and substantially in contact, and a spring having a beveled recess on each side of it, these recesses being axially coincident, there being an aperture through the spring, a continuation of the recesses, the meeting-point of these recesses forming the narrowest part of the aperture through the spring, this narrowest part of the aperture being around the narrowest part of the combined bearing viz: at and in the vicinity of their junction, the bolt or securing device holding the support to the bearings, the bearings being also secured together and holding the spring thereon, substantially as and for the purposes specified.

5. The combination of the body-loop A, having opening A², and the spring C, having the upper opening C³, and lower opening C⁴, united by the middle aperture N, and the bearings D having the bearing part D² in opening C³, and the bearing part E² in the opening C⁴, and essentially one with bearing D² and securing-bolt passing through the opening A² of the support and the bearings, substantially as and for the purposes specified.

6. The combination of the support A with square eye A², bearings D and E, and respectively having bearing-surfaces D², E², inclining toward one another, and the spring having inclining recesses, and embracing the bearings D and E, and a bolt having a square shank located in opening $A^2$, and passing through the bearings, and having a nut, whereby the bearings with spring are held to the support, substantially as and for the purposes specified.

7. The combination of the support A with square eye $A^2$, bearings D and E, and respectively having flanges $D^4$ and $E^4$ and bearing-surfaces $D^2$, $E^2$, inclining toward one another, and the spring having inclining recesses, and embracing the bearings D and E, and a bolt having a square shank located in opening $A^2$ and passing through the bearings and having a nut, whereby the bearings with spring are held to the support, the flange $D^4$ bearing against the support A and the flange $E^4$ against the nut, substantially as and for the purposes specified.

HERMAN H. UCKOTTER.

Attest:
WM. E. JONES,
K. SMITH.